(12) United States Patent
Sakairi (10) Patent No.: US 7,296,222 B1
(45) Date of Patent: Nov. 13, 2007

(54) METHOD AND SYSTEM FOR PREPARING AND DISPLAYING PAGE STRUCTURES FOR WEB SITES

(75) Inventor: Takashi Sakairi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 09/546,719

(22) Filed: Apr. 11, 2000

(30) Foreign Application Priority Data

Apr. 16, 1999 (JP) .................................. 11-109626

(51) Int. Cl.
G06F 15/00 (2006.01)

(52) U.S. Cl. ....................... 715/513; 715/853; 715/854

(58) Field of Classification Search ................ 709/218; 715/513, 713, 853–854; 345/713, 853, 854
See application file for complete search history.

(56) References Cited

U.S. PATENT DOCUMENTS

| | | | | |
|---|---|---|---|---|
| 5,572,643 A * | 11/1996 | Judson | ....................... | 709/218 |
| 5,870,559 A | 2/1999 | Leshem et al. | ......... | 395/200.54 |
| 5,935,210 A * | 8/1999 | Stark | ........................ | 709/224 |
| 6,028,602 A * | 2/2000 | Weidenfeller et al. | ...... | 345/781 |
| 6,035,330 A * | 3/2000 | Astiz et al. | .................. | 709/218 |
| 6,038,330 A * | 3/2000 | Meucci, Jr. | ................. | 381/371 |
| 6,148,311 A * | 11/2000 | Wishnie et al. | ............. | 715/513 |
| 6,191,786 B1 * | 2/2001 | Eyzaguirre et al. | ......... | 345/853 |
| 6,199,098 B1 * | 3/2001 | Jones et al. | ................. | 709/203 |
| 6,236,987 B1 * | 5/2001 | Horowitz et al. | ............. | 707/3 |
| 6,313,835 B1 * | 11/2001 | Gever et al. | ................ | 345/846 |
| 6,334,131 B2 * | 12/2001 | Chakrabarti et al. | .......... | 707/10 |
| 6,360,235 B1 * | 3/2002 | Tilt et al. | ................ | 715/501.1 |
| 6,360,332 B1 * | 3/2002 | Weinberg et al. | .............. | 714/4 |
| 6,426,761 B1 * | 7/2002 | Kanevsky et al. | .......... | 345/788 |
| 6,484,190 B1 * | 11/2002 | Cordes et al. | .............. | 715/514 |
| 6,525,748 B1 * | 2/2003 | Belfiore et al. | ............. | 345/855 |
| 6,560,639 B1 * | 5/2003 | Dan et al. | .................... | 709/218 |

(Continued)

FOREIGN PATENT DOCUMENTS

EP 0802491 4/1997

(Continued)

OTHER PUBLICATIONS

Inder et al., "Atomatic Generation of Diagrammatic Web Site Maps", copyright 1998 ACM, pp. 719-725.*

(Continued)

Primary Examiner—Stephen Hong
Assistant Examiner—Thu Huynh
(74) Attorney, Agent, or Firm—Duke W. Yee; A. Bruce Clay; Betty Formby (57) ABSTRACT

In order to browse a web site by using a browser program running on a computer, a web browser obtains, from a server holding information concerning web sites, the page structure and the attributes for the web pages at the site, and displays them in correlation with each other. Further, the web browser can enable the altering by a user of the display of the page structure and the page attributes, so that in response to user manipulations, the page structure and page attribute display can be dynamically changed. In order to facilitate such an alteration by a user, a GUI (Graphical User Interface) command is provided for changing the page structure and page attribute display.

7 Claims, 10 Drawing Sheets

U.S. PATENT DOCUMENTS 6,697,825 B1 * 2/2004 Underwood et al. ........ 715/530
6,714,201 B1 * 3/2004 Grinstein et al. ........... 345/474

FOREIGN PATENT DOCUMENTS

| JP | 3119465 | 5/1991 |
|---|---|---|
| JP | 8274581 | 10/1996 |
| JP | 9185634 | 7/1997 |
| JP | 9213447 | 8/1997 |
| JP | 105480 | 4/1998 |
| JP | 10-124378 A | 5/1998 |
| JP | 116220 | 6/1998 |
| JP | 171705 | 6/1998 |
| JP | 0222416 | 8/1998 |
| JP | 222523 | 8/1998 |
| JP | 11-085786 A | 3/1999 |
| JP | 085635 | 3/1999 |
| WO | 99/14690 A1 | 3/1999 |

OTHER PUBLICATIONS

Sakairi Takashi, "A Site Map for Visualizing Both a Web Site's Structure and Keywords", copyright 1999 IEEE, pp. 201-205.*

Li et al., "Constructing Multi-Granular and Topic-Focused Web Site Maps", copyright May 2001 ACM, pp. 343-345.*

Berkun, Scott, "Second Sitemap of Microsoft Internet Explorer 4.0," Microsoft Interactive Developer, ASCII Corporation, Jul. 18, 1998, No. 8, p. 89-92.

* cited by examiner (PRIOR ART)

FIG. 3
Web server for site maps with attributes, which is also a content holding web server

METHOD AND SYSTEM FOR PREPARING AND DISPLAYING PAGE STRUCTURES FOR WEB SITES

FIELD OF THE INVENTION

The present invention relates to a system for displaying the page structures for web sites, and in particular to a method and a system for preparing and displaying the page structures for web sites in accordance with the page attributes used at the web sites.

BACKGROUND OF THE INVENTION

There has been a year-to-year increase in the number of web sites at which large volumes of data are available. These web sites manage data by sorting it to a plurality of web pages. In many cases, the web sites also prepare pages describing the web page connecting structure (hereinafter referred to as site maps) in order to show what data is available at the sites and to facilitate data access.

Figure 1:
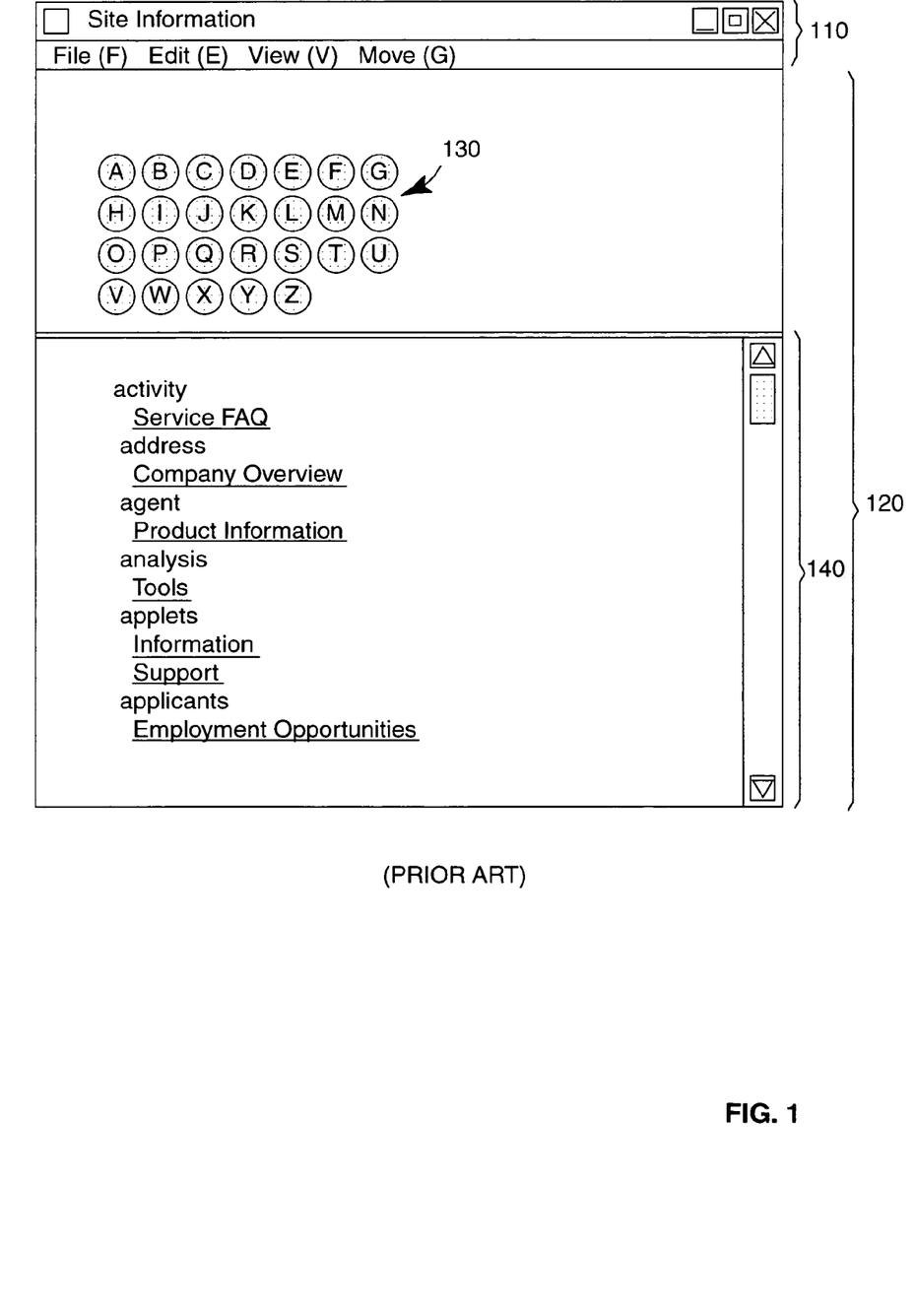
FIG. 1 is a diagram showing a site map for which an example technique for page attributes is used.

Conventional site maps, however, do not efficiently catalog the data that is available at sites, nor do they show where the data is located at the sites. This is because the sites do not effectively utilize page attributes such as, for example, keywords embedded in pages, the sizes of files, the number of files, and the dates on which files are updated. FIG. 1 shows an example of a technique used for page attributes. The example in FIG. 1 is typical of the search pages prepared by web sites to show what information is available at the sites. Here, keywords, which are one type of page attributes used at web sites, are displayed in alphabetical order. In FIG. 1, an area 110 is a typical web browser title and menu bar display area, and in an area 120, information available at the specific web site is displayed. In the search page example, when a graphic icon 130, "A," for example, is selected (clicked on) by using a mouse, keywords used at the web site that begin with an A are displayed in an area 140. When an entry (underlined text) linked to a keyword is clicked on, a web page corresponding to the entry is displayed on the browser.

However, merely providing a list of page attributes for a user is not sufficient, since the list will not help the user understand how the information is assembled and correlated with the page structure of the web site. In the above example, since the list of keywords is not presented in conjunction with a site map, helpful information as to the location and the distribution of a specific keyword in the site structure, and when and how the keyword will appear, is not provided. That is, the conventional technique neither provides means for accurately determining whether the information a user desires is available, nor, if the information is available, where it is located.

SUMMARY OF THE INVENTION

It is, therefore, one object of the present invention to provide a method and system for preparing/displaying the structure of a web site based on attributes associated with the web pages at the web site.

It is another object of the present invention to provide a web site structure display method and system for enabling the updating of the displayed structure of a pertinent web site through user manipulation of the page attributes displayed.

It is an additional object of the present invention to provide a method and a system for making an accurate estimate as to whether information a user desires is available at a pertinent web site.

To achieve the above objectives, the configuration of the present invention is as follows: First, in order to browse a web site by using a browser program running on a computer, a web browser obtains, from a server holding information concerning web sites, the page structure and the attributes for the web pages at the site, and displays them in correlation with each other (hereinafter, also called a site map with attributes). Further, the web browser can enable the altering by a user of the display of the page structure and the page attributes, so that in response to user manipulations the page structure and page attribute display can be dynamically changed. In order to facilitate such an alteration by a user, a GUI (Graphical User Interface) command is provided for changing the page structure and page attribute display. Preferably, the server analyzes its contents or the contents of another web server, prepares the page structure for a web site and a list of page attributes used at the web site, and upon receiving a request from a browser, transmits to the browser a program for displaying the page structure and the page attributes in correlation with each other. A list of page structures and a list of page attributes are displayed, and when one of the entries in the page structure list or in the page attribute list is changed, that change is dynamically reflected in the other list. With this arrangement, the way in which the information desired by a user is assembled in and associated with the page structure for a web site can be flexibly shown.

The server is a web server for site maps with attributes, and is used to analyze and store, for the generation of site maps with attributes, data received from content holding web servers. A content holding web server and a web server for site maps with attributes may be the same server, or they may be different servers. The web server for the site maps with attributes transmits, to the web browser, a program and an HTML web page that are required to display a site map with attributes. To prepare the web page, XML or another language for describing an arbitrary document may be used instead of HTML. A conventional web browser that can execute a Java or a JavaScript program is used as the web browser for a user. The web browser displays a site map with attributes by using the HTML page and the Java or JavaScript program that are received from the web browser for the site maps with attributes and that are required to display the site map with attributes. Further, the web browser updates the display of the site map with attributes in accordance with user manipulation of the contents. It should be noted that in the hardware configuration of the above system, no unique components are included for the site map with attributes. In addition, for the present invention no particular alterations of the content holding web servers are required. A conventional web browser that can execute a Java or a JavaScript program is used unchanged.

To display the structure of a web site, 2D or 3D graphics, or only text, may be used. The range of the display for a site map is not limited to the pages held by one web server, but if necessary, may include pages held by another, connected web site. Furthermore, all the pages held by one web server do not have to be displayed in one site map, and may be divided and displayed in a plurality of site maps. Linking relationships may be used as the structure for a web site, or the structure of file directories stored in the web server may be used as the web site structure. The attribute for each page may be a keyword included in a page, the size of a file, the number of files, or the date a file is to be updated. A simple value, such as the frequency at which a keyword is embedded in a page, may be used as a value representing the attribute for a page, or a value may require high-level calculations, such as tr/idf (term frequency/inter-document frequency), which is used for an information search, may be used.

Figure 2:
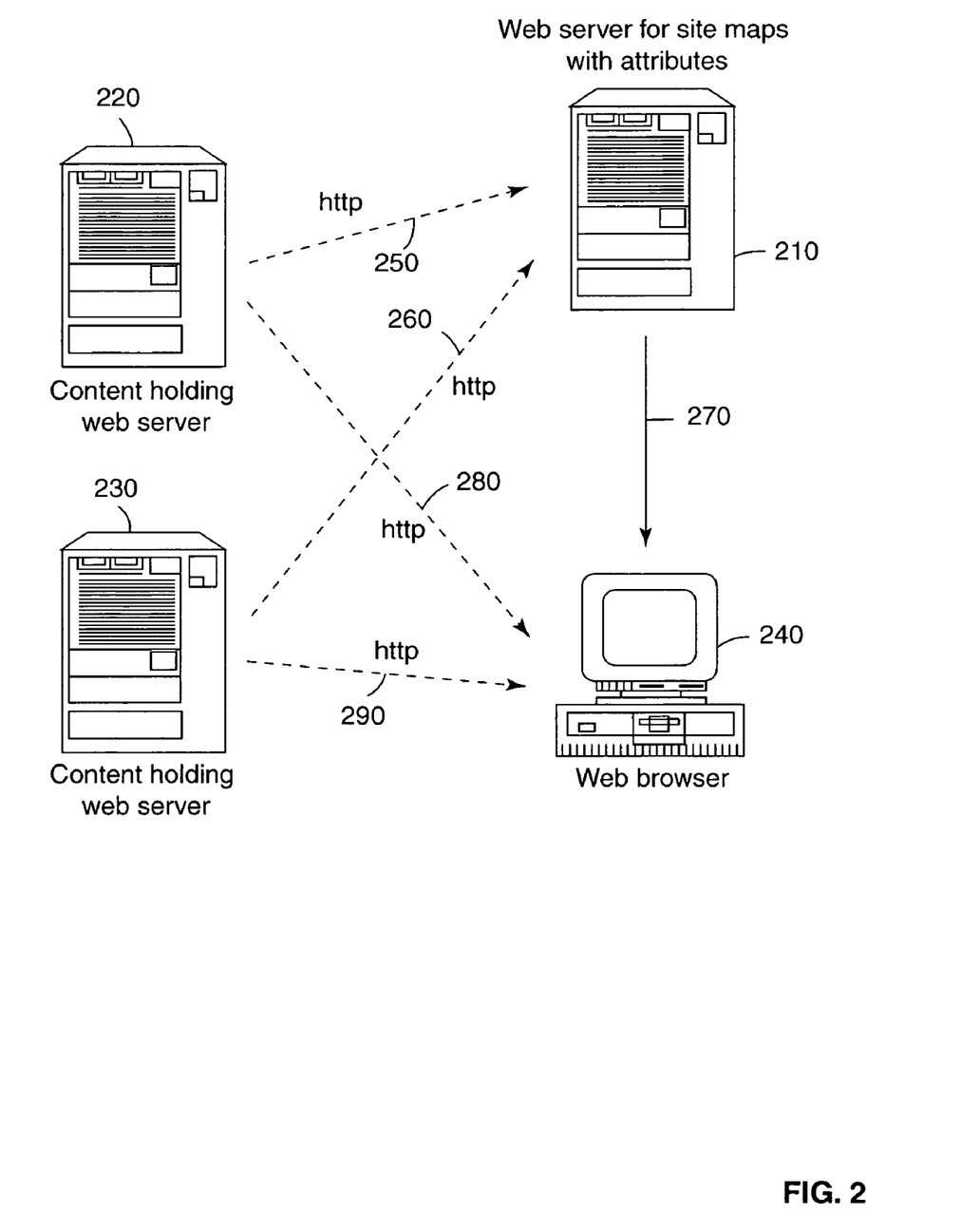
FIG. 2 is a diagram showing the overall structure of an arrangement according to the present invention.

FIG. 2 is a diagram showing the overall structure of an arrangement according to the present invention. The transmission of information concerning a site map with attributes is indicated by a solid line, and the transmissions of web server contents is indicated by broken lines. A web server 210 for site maps with attributes generates site maps with attributes for the content holding web servers 220 and 230, and transmits, to a web browser 240, information required to display the generated site maps for the content holding web servers 220 and 230. The web browser 240 displays the site maps generated by the web server 210 and the contents provided by the web servers 220 and 230.

The web server 210 obtains the contents held by the web servers 220 and 230 via http connections 250 and 260, and stores the page structures for the web sites and the attributes for the pages at the web sites. Upon receiving a request from the web browser 240, the web server 210 transmits to the web browser 240, along an http connection 270, an HTML page and a program written in Java or JavaScript, which are required to display a site map with attributes. If a user of the web browser 240 finds an object page on the site map, he or she obtains the contents of the web servers 220 and 230 along http connections 280 and 290. This is an effective structure for a portal site.

In FIG. 2, the two content holding web servers 220 and 230 are used. The number of such web servers may be one, or three or more. The http communication sequence first uses the connections 250 and 260, then the connection 270, and finally the connections 280 and 290. It should be noted that to avoid complexity, in the drawing of the communication sequence, no http requests are shown. The web server contents are transmitted by each server to the web browser 240 when a request using the http protocols is issued to the server by the browser 240. Therefore, in the following drawings, it is assumed that http requests for contents were previously transmitted in directions opposite to those in which contents are transmitted.

Figure 3:
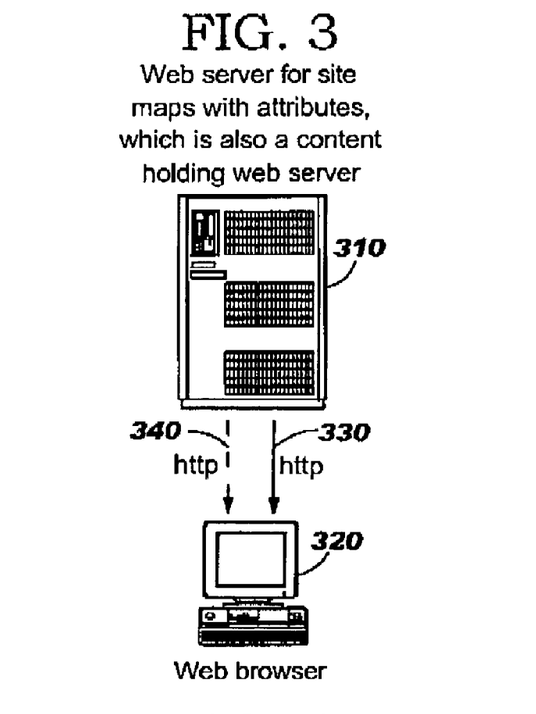
FIG. 3 is a diagram showing the overall structure of another arrangement according to the present invention.

A content holding web server can also serve as the web server for site maps with attributes. FIG. 3 is a diagram showing the overall arrangement of the present invention when a content holding web server also serves as a web server for site maps with attributes. A web server 310 serves as the web server for site maps with attributes and also as the content holding web server. A web browser 320 displays a site map generated by the web server 310 and the contents that are also provided by the web server 310.

The web server 310 stores the contents, page structures for web sites and page attributes for web pages at the web sites. Upon receiving a request from the web browser 320, the web server 310 transmits, along an http connection 330, an HTML page and a program written in Java or JavaScript required to display a site map with attributes. If a user of the web browser 320 finds an object page on the site map, he or she obtains the contents from the web server 310 along an http connection 340. This structure is effective when a site map with attributes is used as a normal web site, rather than as a portal site. The http communication sequence is first performed along connection 330 and then along connection 340.

Figure 4:
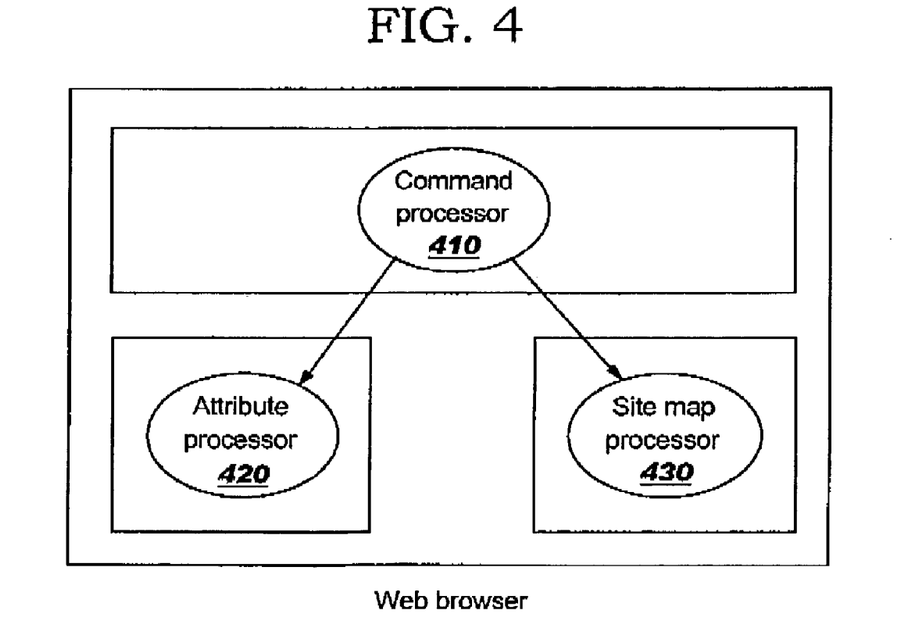
FIG. 4 is a diagram showing the structure of a browser when it displays a site map with attributes according to the present invention.

FIG. 4 is a diagram showing the structure of a web browser of the present invention. Along http connections, a web browser receives, from a web server for site maps, an HTML page and a program written in Java or JavaScript required to display a site map with attributes. The web browser then displays the site map. The program written in Java or JavaScript includes a command processor 410, an attribute processor 420 (page attribute processor), and a site map processor 430 (page structure processor). The command processor 410 is a module for processing commands. The attribute processor 420 is a module for displaying and processing a list of attributes. The site map processor 430 is a module for displaying and processing a site map.

The command processor 410 permits a user to display a list of attributes or to manipulate a site map by using a button, instead of presenting on a display screen the attribute list or the site map. For example, a process for selecting all the attributes on the list or for canceling the selection of an attribute is performed by depressing a corresponding button. The attribute processor 420 displays a list of page attributes used at a web site. Further, in accordance with the manipulation of the attribute list by a user, the attribute processor 420 updates the display of the site map by performing filtering so that only a page having an attribute designated by a user is displayed, or by changing the color and thus highlighting a page in which an attribute designated by the user is embedded. That is, the page structure is dynamically changed by altering the page attribute. A page attribute used at a web site can be, for example, a keyword embedded in a page, a file size, the number of files, or the date a file is to be updated. The site map processor 430 uses linking information to build and display the page structure at a web site. The method used to display a site map is one for which 2D or 3D graphics are used, or a method for which only text is used. The present invention does not depend on a specific site map display method, and can be applied for an arbitrary site map display method. When a user selects a page on a site map, the site map processor 430 displays, on the list, an attribute for the selected page. That is, the page attributes are dynamically changed by altering the page structure.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 5:
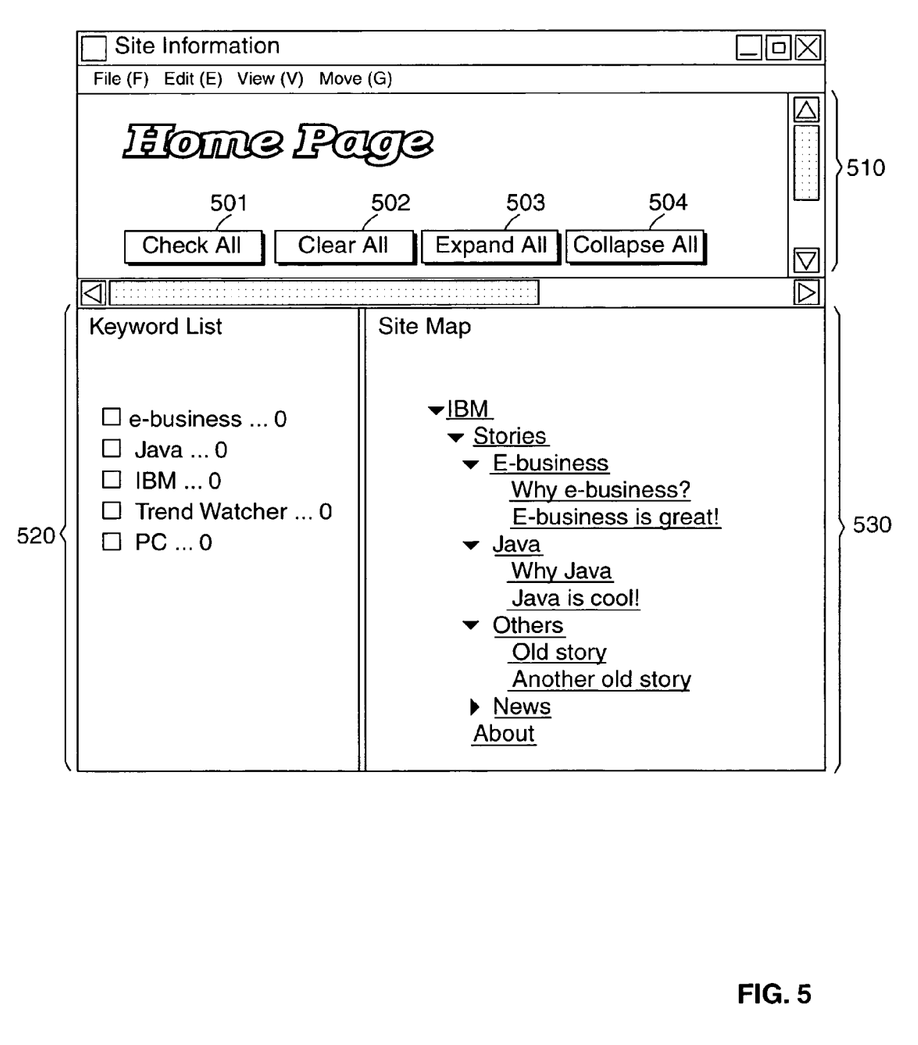
FIG. 5 is a diagram showing an example display of a site map with attributes.

FIG. 5 is a diagram showing an example display of a site map with attributes according to the present invention. A list of attributes is displayed in a lower left frame 520, and a site map is displayed in a lower right frame 530. In this example, the frequency at which a keyword is embedded in a page at a web site is displayed as an attribute. For the site map only text is used; one page represented by each row of text. The indentation of the text rows is used to indicate different structural levels at a web site. A triangle pointing down in frame 530 indicates that the structure of at least one lower level is developed and is displayed. A triangle pointing to the right indicates that no lower structural levels are shown. Buttons for instructing the execution of various GUI (Graphical User Interface) commands are displayed in a frame 510. The buttons shown are a Check All button 501, for examining all the check boxes in the frame 520; a Clear All button 502, for clearing all the check boxes in the frame 520; an Expand All button 503, for fully developing the structure shown in the frame 530; and a Collapse All button 504, for fully collapsing the structure shown in the frame 530.

Figure 6:
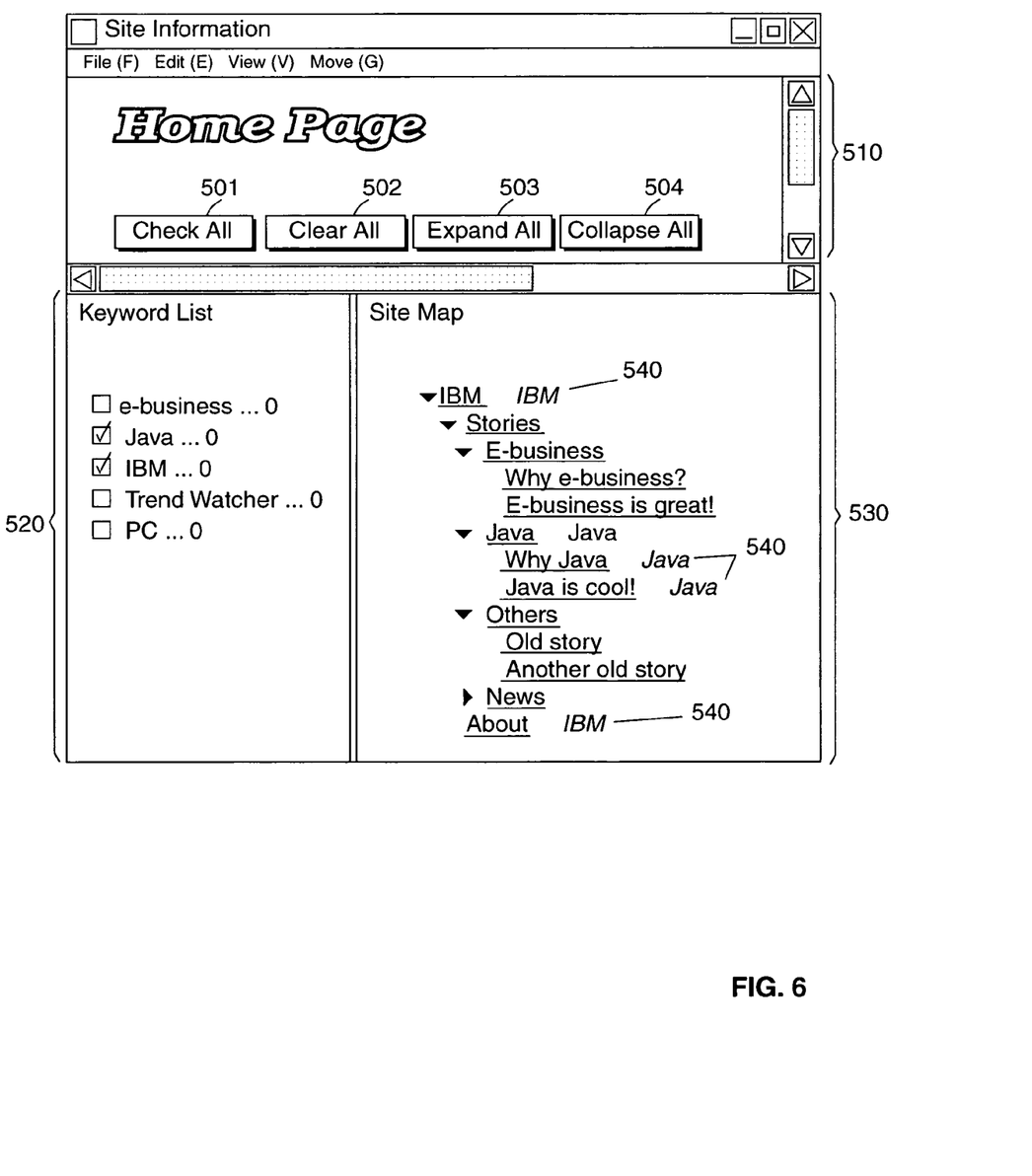
FIG. 6 is a diagram showing an example wherein the display of a site map with attributes is updated by manipulating a list of attributes in the site map.

FIG. 6 is a diagram showing the state wherein the display of the site map is updated by the manipulation of the attribute list by a user. When the user selects two keywords, "Java" and "IBM", from a keyword list in the lower left frame 520, in the site map in the lower right frame 530, rows (540) for pages in which these keywords are embedded are highlighted by changing their color, and the keywords embedded in the pages are displayed using italics. The method used here for updating the display of the site map is merely an example, and the updating may be accomplished by changing the luminance, the font type or the font size, or by blinking.

Figure 7:
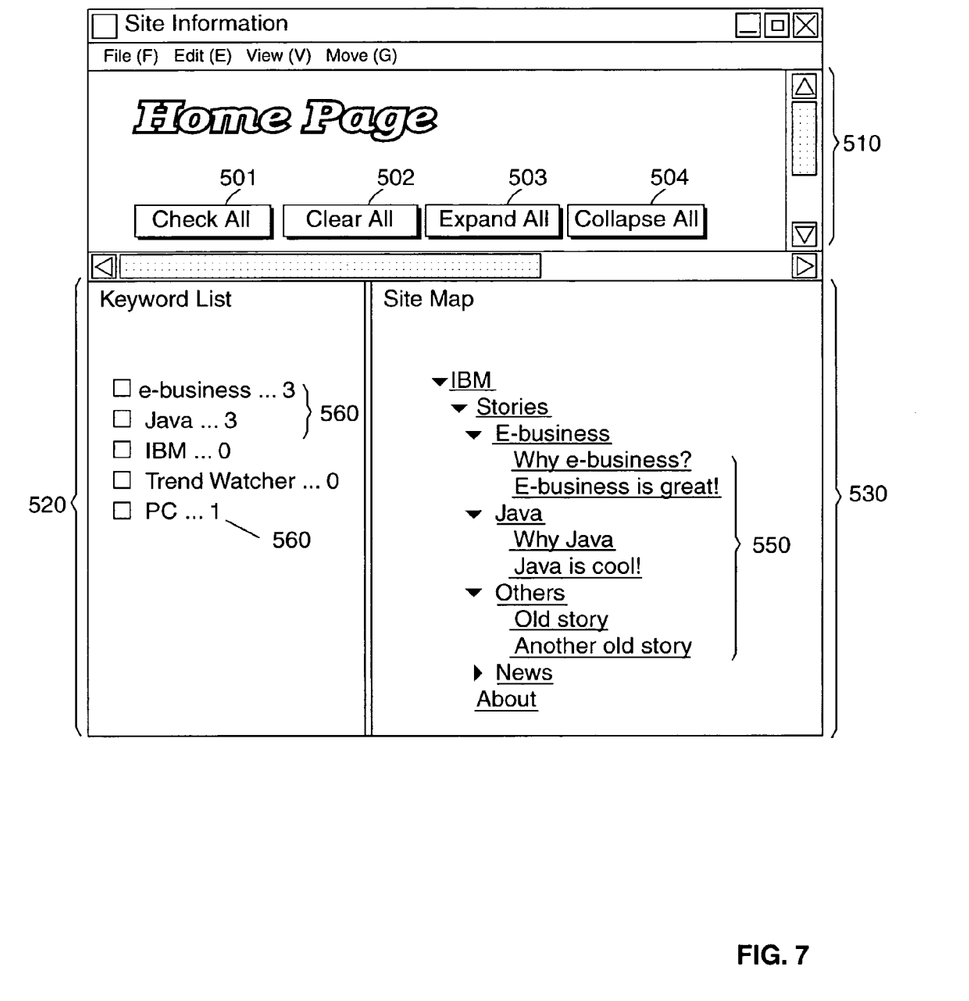
FIG. 7 is a diagram showing an example where the display of an attribute list is updated by manipulating a site map with attributes.

FIG. 7 is a diagram showing the state wherein the display of the attribute list is updated by the manipulation of the site map by a user. When the user selects 10 pages (550) following Stories in the site map in the lower right frame 530, keywords (560) embedded in these pages are highlighted in the attribute list in the lower left frame 520 by changing their color, and the numbers of the selected pages in which the keywords are embedded are shown following the keywords. The method used here for updating the display of the attribute list is merely an example, and the display of the attribute list may be updated by changing the luminance, the font type or the font size, or by blinking.

Figure 8:
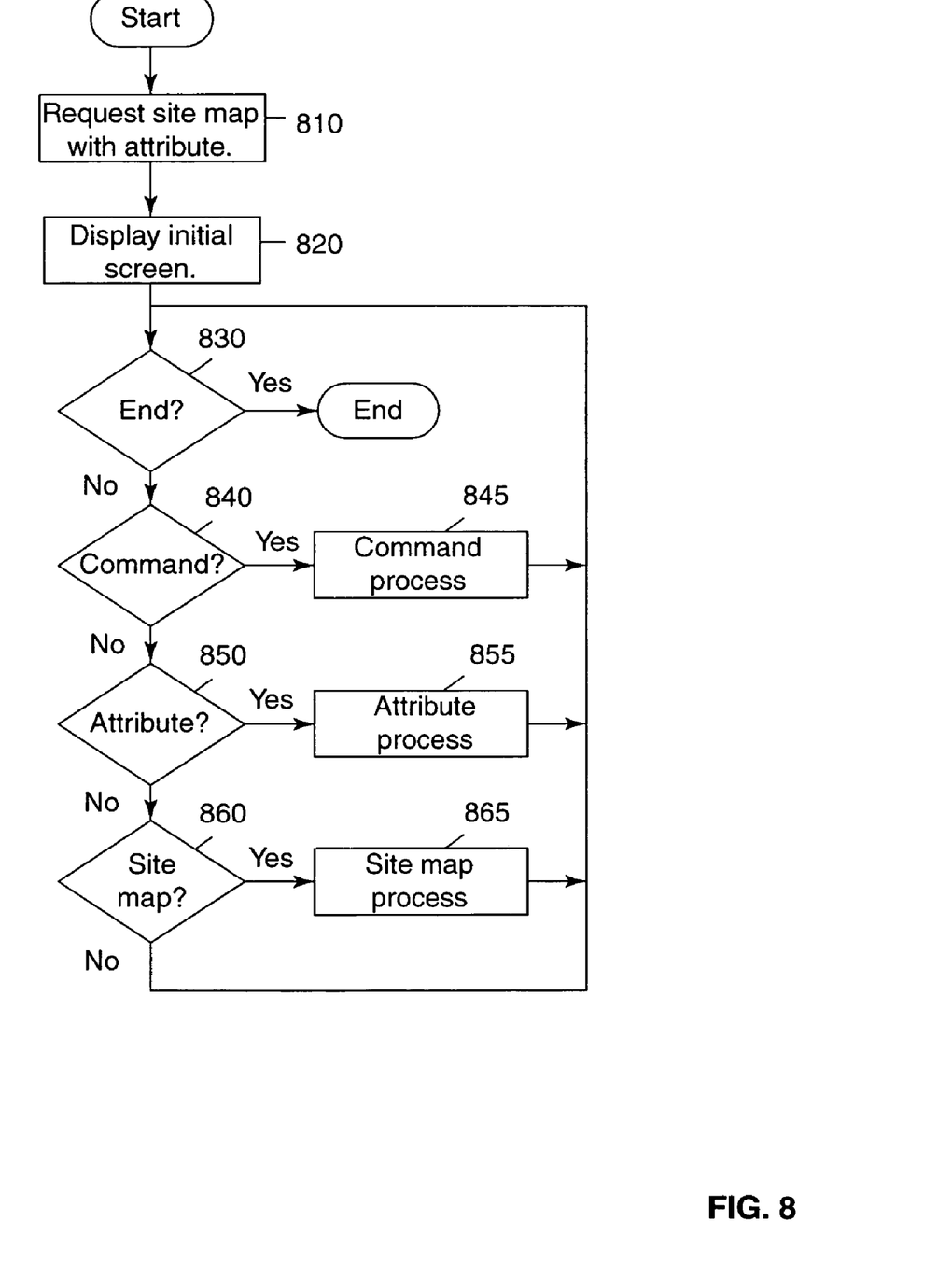
FIG. 8 is a flowchart showing the processing performed by the browser using a program received from a server.

FIG. 8 is a flowchart showing the processing performed by a web browser when it receives, along an http connection, from a web server for site maps an HTML page and a program written in Java or JavaScript required to display a site map with attributes. For convenience sake, in the description of the flowchart, the interrupt process performed when a mouse event occurs is initiated by each determiner in the flowchart, even when a corresponding event handler is activated. At step 810, the web browser requests from the web server the HTML page and the program written in Java or JavaScript required to display a site map with attributes. At step 820, the web browser uses the site map and the program and the HTML that are received from the web server to display the initial screen for the site map with attributes. At step 830, the web browser determines whether to terminate the process. If another page is displayed or the execution of the procedure by the web browser is halted, the processing is terminated. At step 840, the web browser examines a command. In other words, the web browser determines whether a user manipulates an attribute list or a site map by depressing a button, instead of using the display of the attribute list or the site map. At step 845, the command is processed. For this processing, an instruction is executed that is entered by the user while using the button for the attribute list or the site map. At step 850, the attributes are examined. The web browser determines whether the user used a mouse to select a desired attribute from the list. At step 855, the attribute process is performed. During this processing, the web browser updates the display of the site map by filtering, so that only a page having an attribute designated by the user is displayed, or by highlighting a page having an attribute selected by the user by changing the color of the page. At step 860, a site map is examined. The web browser determines whether the user used a mouse to select a desired page in the site map. At step 865, the site map process is performed. During this process, when the user selects a page in the site map, an attribute embedded in the selected page is displayed in the list.

Figure 9:
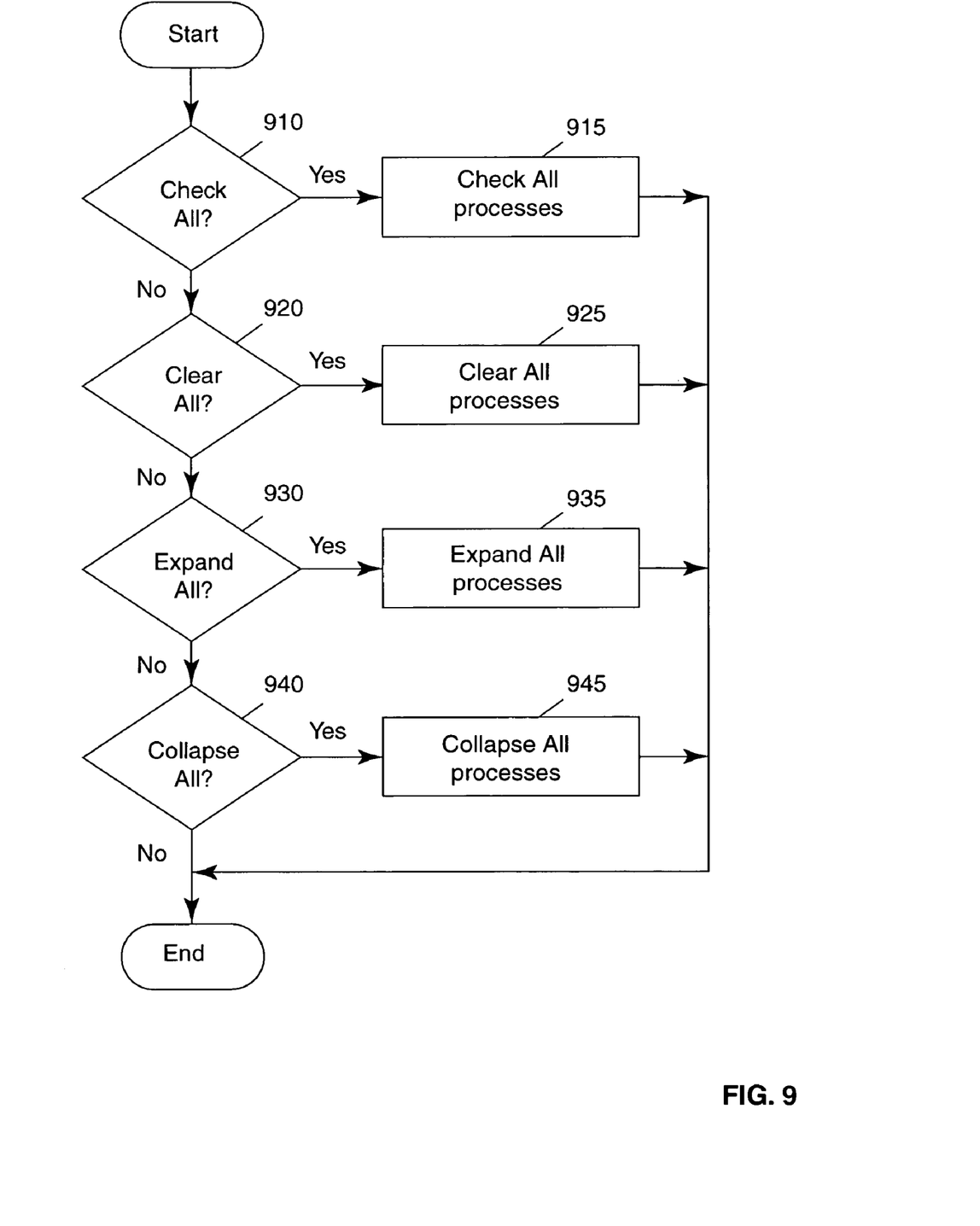
FIG. 9 is a detailed flowchart showing the GUI command process.

FIG. 9 is a detailed flowchart showing the GUI command process at step 845. Instead of this GUI command process, various other processes can be performed as needed, and the processing in FIG. 9 is merely an example. At step 910, a check all determination is performed, i.e., whether the Check All button was depressed is determined. At step 915, the Check All process is performed. For this process, the command processor 410 instructs the attribute processor 420 to examine all the available attributes. The attribute processor 420 instructs the site map processor 430 to highlight, on the site map, a page in which the examined attribute is embedded. At step 920, a clear all determination is performed, i.e., whether the Clear All button was depressed is determined. At step 925, the Clear All process is performed. For this process, the command processor 410 instructs the attribute processor 420 to clear all the attribute checkboxes. The attribute processor 420 instructs the site map processor 430 to cancel the highlighted display in the site map for the pages in which the cleared attributes are embedded. At step 930, an expand all determination is performed, i.e., whether the Expand All button was depressed is determined. At step 935, the Expand All process is performed. For this process, the command processor 410 instructs the site map processor 430 to develop the entire web site structure. At step 940, a collapse all determination is performed, i.e., whether the Collapse All button was depressed is determined. At step 945, the Collapse All process is performed. For this process, the command processor 410 instructs the site map processor 430 to cancel the development of the web site structure and to display only the outline structure.

Figure 10:
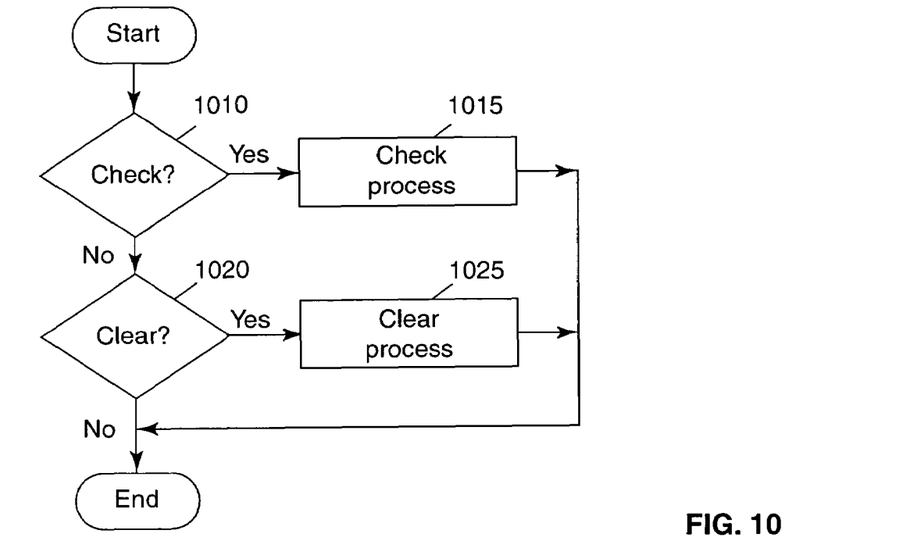
FIG. 10 is a detailed flowchart showing the page attribute process.

FIG. 10 is a detailed flowchart showing the attribute process at step 855. During the attribute process, various other processes can be performed as needed. At step 1010, whether a check box was selected is determined. At step 1015, the Check process is performed. For this process, the attribute processor 420 instructs the site map processor 430 to highlight, in the site map, a page in which the checked attribute is embedded. The display of page structures is dynamically changed by the alternation by a user of the page attribute display. At step 1020, the clear determination is performed, i.e., whether the check boxes were cleared is determined. At step 1025, the Clear process is performed. For this process, the attribute processor 420 instructs the site map processor 430 to cancel the highlighting of pages in the site map in which the cleared attributes are embedded.

Figure 11:
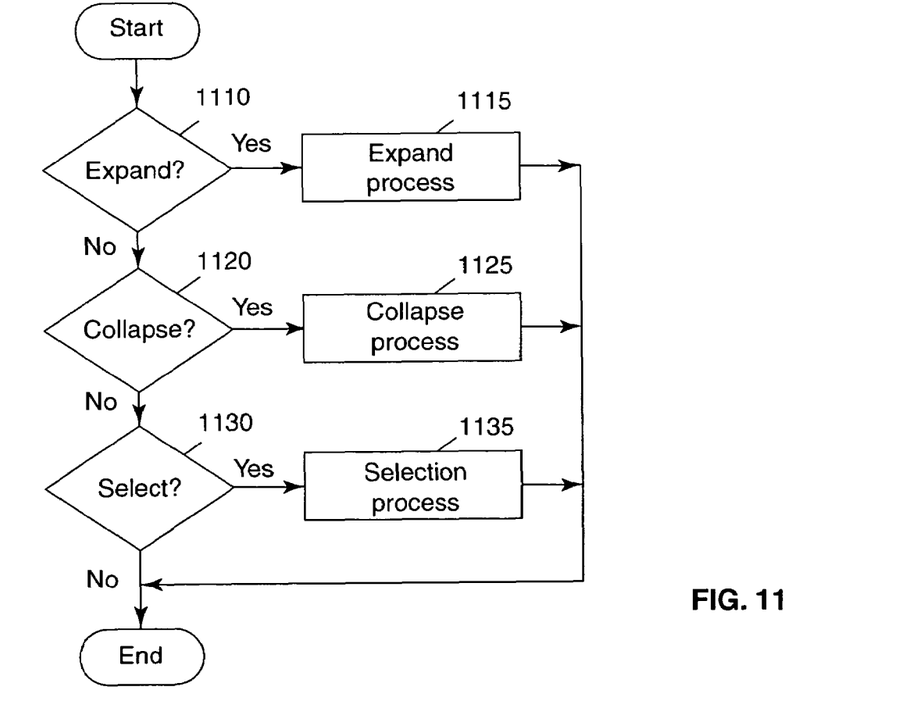
FIG. 11 is a detailed flowchart showing the page structure (site map) process.

FIG. 11 is a detailed flowchart showing the site map process at step 865. During the site map process, various other processes can be performed as needed. At step 1110, Expand determination is performed, i.e., whether the triangle pointing to the right for enabling Expand was clicked on is determined. At step 1115, the Expand process is performed. For this process, the site map processor 430 develops a portion designated in the site map by one level, and displays the results. At step 1120, the Collapse determination is performed, i.e., whether the triangle pointing down for enabling Collapse was clicked on is determined. At step 1125, the Collapse process is performed. In this process, the site map processor 430 cancels the development of the portion designated in the site map. At step 1130, the selection determination is performed, i.e., whether a portion representing a page in the site map was clicked on is determined. At step 1135, the selection process is performed. During this process, the site map processor 430 changes the background of the selected portion, and instructs the attribute processor 420 to display the attribute (e.g., the frequency at which a keyword appears) of the keyword embedded in the selected page. Therefore, the page attribute display is dynamically changed by the alteration by the user of the page structure display.

Figure 12:
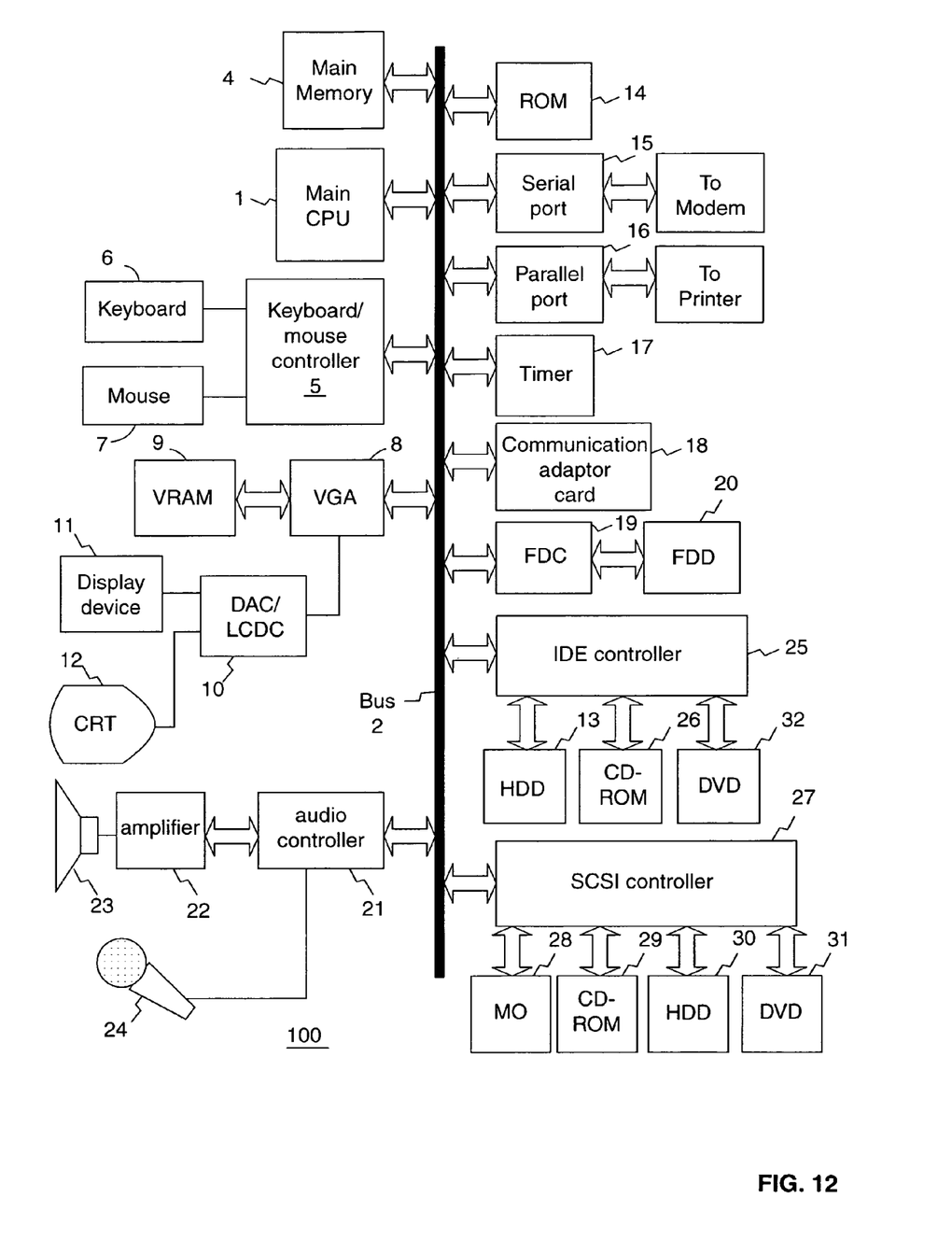
FIG. 12 is a diagram illustrating the hardware arrangement of a server or a browser used for the present invention.

In FIG. 12 is shown the general hardware arrangement for the server or the browser (computer) according to the present invention. A system 100 comprises a central processing apparatus (CPU) 1 and a memory 4. The CPU 1 and the memory 4 are connected by a bus 2 and an IDE controller 25 to a hard disk drive 13 (or to a storage medium drive, such as a CD-ROM 26 or a DVD 32), which is an auxiliary storage device. Similarly, the CPU 1 and the memory 4 are connected by the bus 2 and a SCSI controller 27 is connected to a hard disk drive 30 (or to a storage medium drive, such as an MO 28, a CD-ROM 29 or a DVD 31), which is an auxiliary storage device. A floppy disk drive 20 is connected to the bus 2 via a floppy disk controller 19.

A floppy disk is loaded into the floppy disk drive 20, and code or data for a computer program, which interacts with an operating system and issues instructions to the CPU 1 to implement the present invention, can be stored on the floppy disk, or on the hard disk drive 13 (or on the CD-ROM 26 or the DVD 32), and in a ROM 14. This computer program is executed by loading it into the memory 4. The code for the computer program can be compressed, or can be divided into a plurality of segments for storage on a plurality of storage mediums. For example, a program for receiving a page structure and a page attribute for each page at a web site, and for displaying the page structure and the page attribute in correlation with each other is recorded on a recording medium, such as a diskette, and this diskette can be loaded into another computer.

The system 100 further comprises user interface hardware components such as a pointing device (a mouse or a joystick) 7 and a keyboard 6 for entering data, and a display device 12 for providing visual data for a user. The results obtained by a tamper resistant device when deleting additional embedded information may be presented on the display device 12. Furthermore, a printer can be connected to the system 100 via a parallel port 16, or a modem can be connected via a serial port 15. For communicating with another computer, the system 100 can be connected to a network via the serial port 15 and a modem, or via a communication adaptor 18 (an ethernet or a token ring card). The system may be connected via the internet to a content holding web site in this invention, or can be a local server in the WAN or the LAN. The accomplishment of the present invention is not affected. A remote transmitter/receiver may be connected to the serial port 15, or to the parallel port 16, for exchanging data with the system 100 using infrared rays or wires.

A loudspeaker 23 in the system 100 is used to receive, via an amplifier 22, an audio signal produced by a D/A conversion (digital/analog conversion) performed by an audio controller 21, and to output the signal as sound. The audio controller 21 performs the A/D (analog/digital) conversion of audio data received via a microphone 24 in order to introduce external audio data into the system 100. The ViaVoice (a trademark of IBM) application may be used to perform the GUI command process of the present invention in accordance with a voice command. Further, the home page reader (a trademark of IBM) application may be used to browse and read displayed web site information and reproduce it using voice synthesis.

As is described above, it would be easily understood that the server of the present invention can be provided by a common personal computer (PC); a workstation, a notebook PC, a palmtop PC or a network computer, or a television set or another electric home appliance that incorporates a computer; a game machine having a communication function; a communication terminal having a communication function, such as a telephone, a facsimile machine, a portable telephone, a PHS or a PDA; or a combination of the components described above. It should be noted, however, that these components are merely examples and not all of them are required for the present invention.

According to the present invention, the page structure (site map) and the page attributes used at a web site are displayed on one screen in correlation with each other, which is not possible with the prior art. Further, the display of the site map can be changed by user manipulation of the attribute list, or the page attribute display can be changed by user manipulation of the site map.

Although the present invention has been described with respect to a specific preferred embodiment thereof, various changes and modifications may be suggested to one skilled in the art and it is intended that the present invention encompass such changes and modifications as fall within the scope of the appended claims.

What I claim is:

1. A method for browsing a web site using a browser program running on a computer, comprising the steps of:
    (a) receiving, from a server for a web site, a plurality of page structures and a plurality of page attributes for said web site, including information concerning said web site;
    (b) displaying said plurality of page structures and said plurality of page attributes on a screen for a user;
    (c) receiving, from the user, an input selecting either ones of said plurality of page structures or ones of said plurality of page attributes; and
    (d) in response to receiving said input from the user, dynamically changing the display of at least one of said plurality of page structures if ones of said plurality of page attributes were selected and dynamically changing the display of at least one of said plurality of page attributes if ones of said plurality of page structures were chosen, wherein the display that is dynamically changed reflects a correlation between said page structures and said page attributes;
    wherein said page attributes are keywords included in said web pages at said web site, a number of times said keywords appear, sizes of files, a number of files and dates files are updated.

2. A web site browsing system, which includes a server holding information for a web site and a browser connected to said server for browsing said a web site, comprising:
- (a) means for requesting, from said server, a plurality of web structures at said web sites and a plurality of attributes of said web pages, and for receiving said plurality of page structures and said plurality of page attributes; and
- (b) means for displaying said plurality of page structures and said page attributes:
- (c) means for receiving, from the user, an input selecting either ones of said plurality of page structures or ones of said plurality of page attributes; and
- (d) means for dynamically changing, in response to receiving said input from the user, the display of at least one of said plurality of page structures if ones of said plurality of page attributes were selected and dynamically changing the display of at least one of said plurality of page attributes if ones of said plurality of page structures were chosen, wherein the display that is dynamically changed reflects a correlation between said page structures and said page attributes;
- wherein said page attributes are keywords included in said web pages at said web site, a number of times said keywords appear, sizes of files, a number of files and dates files are updated.

3. The web site browsing system according to claim 2, wherein said server includes means for using contents held by said server or by another web server to prepare said web page structures and said page attributes for said web pages at said web site.

4. The web site browsing system according to claim 2, wherein said server includes means for upon receiving a request from said browser, transmitting to said browser a program that includes a command processor, a page attribute processor and a page structure processor, all of which are required to display said page structures and said page attributes in correlation with each other.

5. The web site browsing system according to claim 4, wherein said command processor includes means for, in accordance with a browser change manipulation performed by a user, displaying a command for changing a display of said page structures and said page attributes, as well as said page structures and said page attributes.

6. The web site browsing system according to claim 4, wherein said program includes means for displaying, together with said page structures and said page attributes, a list of command areas for changing the displays of said page structures and said page attributes.

7. A web site browsing computer, which includes a communication device for communicating with another computer; and a display device for browsing and displaying a web site by using a web site browser program, said web site browsing computer comprising:
- (a) means for receiving, via said communication device, page structures at said web site and page attributes included in web pages from a computer holding information for said web site; and
- (b) means for using said web site browser program to display said page structures and said page attributes;
- (c) means for receiving, from the user, an input selecting either ones of said plurality of page structures or ones of said plurality of page attributes; and
- (d) means for dynamically changing, in response to receiving said input from the user, the display of at least one of said plurality of page structures if ones of said plurality of page attributes were selected and dynamically changing the display of at least one of said plurality of page attributes if ones of said plurality of page structures were chosen, wherein the display that is dynamically changed reflects a correlation between said page structures and said page attributes;
- wherein said page attributes are keywords included in said web pages at said web site, a number of times said keywords appear, sizes of files, a number of files and dates files are updated.

\* \* \* \* \*